(12) United States Patent
Galanty et al.

(10) Patent No.: US 6,311,905 B1
(45) Date of Patent: Nov. 6, 2001

(54) SCREEN CLEANING AND COMMINUTING SYSTEM

(75) Inventors: William B. Galanty, Short Hills; Alexander Vilensky, East Brunswick, both of NJ (US)

(73) Assignee: Franklin Miller, Inc., Livingston, NJ (US)

( * ) Notice: Subject to any disclaimer, the term of this patent is extended or adjusted under 35 U.S.C. 154(b) by 0 days.

(21) Appl. No.: 09/498,855

(22) Filed: Feb. 7, 2000

(51) Int. Cl.⁷ .................................................. B02C 18/40
(52) U.S. Cl. ..................... 241/21; 241/24.11; 241/46.06; 241/81; 241/236
(58) Field of Search .............................. 241/46.02, 46.04, 241/46.06, 73, 236, 81, 21, 24.11; 210/173, 174

(56) References Cited

U.S. PATENT DOCUMENTS

| | | | |
|---|---|---|---|
| 2,672,985 | 3/1954 | Nordell . | |
| 4,919,346 | 4/1990 | Chambers, Sr. | 241/46.02 |
| 5,061,380 | 10/1991 | Stevenson | 210/768 |
| 5,320,286 | 6/1994 | Chambers et al. | 241/46.02 |
| 5,490,922 | 2/1996 | Gresa . | |
| 5,505,388 | 4/1996 | Chambers et al. | 241/46.02 |
| 5,833,152 | 11/1998 | Galanty . | |

Primary Examiner—Mark Rosenbaum
(74) Attorney, Agent, or Firm—Selitto, Behr & Kim

(57) ABSTRACT

A sewage cleaning and comminuting system is provided with a transverse semi-circular concave filtering screen that extends across an influent channel which intercepts all solids too large to pass therethrough. A combined screen cleaning and comminuting grinder unit is mounted in front of the screen in close relationship. It has a concave surface for reciprocating motion therebetween along the full extent of the screen, so as to clean and remove large solids intercepted by the screen surface, and to subsequently comminute such larger solids. As they are recirculated back into incoming flow of sewage, larger solids are ground into smaller solids by the grinder so that they can pass through the screen. A semi-circular screen in combination with a grinder is a preferred embodiment of the system. The system includes a single or multiple drive means whereby the comminuting grinder is actuated and provided with the reciprocating motion along the surface of the screen.

15 Claims, 5 Drawing Sheets

SCREEN CLEANING AND COMMINUTING SYSTEM

FIELD OF INVENTION

The present invention relates to a screen cleaning and comminuting system for sewage. The system comprises an intercepting and filtering screen for sweeping agglomerated or captured solids of large size and means for subsequently comminuting such particles into smaller solids that may pass through the screen.

BACKGROUND OF THE INVENTION

Prior art processing of sewage and wastewater often involves handling large volumes of sewage and wastewater flow in a channel, in order to separate solid and agglomerated matter therein and comminute such matter. It employs means of various screening and shredding devices in combination, which are positioned in the wastewater flow within the channel.

U.S. Pat. No. 5,490,922 discloses a sewage water installation that has a discharge basin in which is arranged a screening unit linked to a back-and-forth movable cleaning carriage. The mesh screen unit is depicted schematically and includes a plurality of parallel spaced bars forming the screen. A cleaning car, which moves back and forth, is allocated to the mesh screen. If the mesh screen is longer, several cleaning cars can be provided. A preferred cleaning car is provided with teeth that are designed correspondingly and arranged to protrude between the screen bars of the mesh screen and is intended for cleaning between the screen bars.

U.S. Pat. No. 2,672,985 discloses a transverse linear screen extending across an influent channel that intercepts all solids too large to pass therethrough. The screen consists of a plurality of parallelly disposed U-shaped members, with the U-shaped portions extending towards the inflowing sewage, forming a series of slots of the screen. A comminuting unit is disposed in parallel spaced relationship and in close proximity with the screen surface to remove collected solid materials therefrom by means of a cutting cylinder having a rotable shaft to which a plurality of cutting cylinders and combs are secured. As the comminuting unit travels back and forth along the width of a single linear screen by means of a direct drive motor in engagement with a rack device, the teeth project into the U-shaped portion of the slot members so as to remove solids intercepted by the screen. More details may be seen in FIGS. 5, 9, 10, 11 and 12 of the patent.

In U.S. Pat. No. 5,833,152, a unitary comminuting system, adapted for wastewater channel use, is provided with devices, which include a single or dual semi-cylindrical-like sizing screen. Each has a circular rotating sweeping mechanism of interactive slotted comb bars or blades. It sweeps and clears lodged or agglomerated solids adhering to the outer convex circumference surface of the screen, disposed in parallelly spaced relationship with a twin shaft shredder device having two parallel shafts with shredder or grinder teeth along the length thereof that rotate in opposite senses. The unitary system of devices is positioned perpendicularly between the influent and effluent sides of the wastewater flow in a channel so that solids therein will encounter the convex surface of the semi-cylindrical-like sizing screens or the twin shaft shredder as the wastewater flows through the channel. Both the single or dual semi-cylindrical-like screen devices cause solids, which do not flow directly there through, to be forcefully swept from the outer convex surface of the sizing screen. This employs the separate rotating sweeping interactive blade mechanism into surrounding the wastewater flow, so as to cause and divert or direct the solids to flow toward or into the contiguous twin shaft shredder device. This is aided by circulating wastewater currents generated in the wastewater flow near the entrance to the twin shaft shredder. It is generated in part by the rotating sweeping interactive blades of the screening devices, whereupon the removed solids are channeled into the twin shaft shredder device along with the other wastewater and solids flow where they are reduced in particle size.

These prior art devices were crudely constructed, difficult and costly to install, because they provide coarse and incomplete particulate processing and unreliable systems subject to frequent maintenance.

In U.S. Pat. No. 4,919,346, a moving mesh conveyor-screen allows flow to pass through while it diverts the solids to an adjacent twin shaft grinder for reduction in a unitized system. This invention is subject to screen maintenance and effectiveness problems as well as cutting efficiency problems to be discussed below. Its invention was superceded by U.S. Pat. No. 5,505,388 design because the screen was ineffective at transporting solids during low flow conditions, subject to plastering of solid debris against the mesh screen surface, and breakage due to stretching caused by water pressure.

U.S. Pat. No. 5,505,388 is substantially identical to the above patent with the exception that the mesh-screen is wrapped around a sprocket to form a rotating drum like member. Again, the rotating screen acts to allow flow to pass through while diverting oversized solids to the adjacent grinder. The operation can be inefficient and maintenance prone, because unreduced solids can bypass the grinder and pass downstream not masticated and because there are gaps between the rotating screen and the cutters through which a percentage of the solids pass unreduced. Further, solids become embedded in the rotating mesh drum-like screen and eventually get back-flushed downstream unprocessed. Maintenance problems include the solids are trapped within the central portion of the drum-like screen requiring maintenance for cleaning. The screen wears due to abrasion against bottom grit in the channel. In contrast to the present invention, solids accumulating within the unit during power outages often require the unit to be manually cleared of debris before it can be restarted. Only approximately one quarter of the screen area is workable, as the part closest to the channel walls cannot effectively transport the solids, and the part in the back of the drum is not active. This results in a reduction in liquid handling capacity.

U.S. Pat. No. 5,061,380 discloses another grinder-diverting system. It utilizes multiple parallel shafts with substantially parallel disks mounted thereupon, which intermesh one with another. The disks all rotate in a direction towards a vertically disposed grinder mounted to one side. This invention use an excessive amount of disks, drives and seal components, and thus makes it extremely difficult to maintain. Solids such as wood can become lodged within the disks and present a blockage condition requiring manual removal.

None of the above inventions is output controlled by any filtering device to assure a high percentage of reduction. The above devices suffer from components in the flow, which are subject to failure, wear, inefficient operation, seal failure, mechanical drive failure.

Accordingly, from a review of the foregoing prior art, it can be readily appreciated that it is desirable to find a comminution and screen cleaning system, which is simple and cost effective in construction and having low maintenance requirements. It is also preferred to remain rugged, efficient and effective for cleaning large size matter from the surface of a sizing screen and subsequently comminuting such removed matter along with other matter contained in the flow of wastewater at all levels in a sewage channel to smaller particle sizes.

SUMMARY OF THE INVENTION

Therefore, it is an object of the invention to create an efficient system and to provide a solution to the deficiencies of the prior art devices.

It is another object of the invention to provide a comminution and screening system for reducing particle sizes in high flow sewage. The system comprises two primary interacting components. One component is a traveling grinder unit, having intermeshing cutters on parallel shafts, which rotate in oppose sense to one another. The other is a continuous concave stationary semi-cylindrical filtering and sizing screen, where the grinder unit acts to clear larger sizes of solid particles off and away from a screen surface as it travels in close proximity to the screen. The grinder unit is disposed towards the outside of a rotary turn-table, which is held on a central axis with top and bottom bearing supports and is coupled to a drive means to create an oscillating or reciprocating motion. Its cutters rotate at close clearance to the concave side of the stationary semi-cylindrical surface of the sizing screen. As the twin shaft grinder clears the concave front surface of the screen, the cutters of the grinder sweep the solids in the opposite direction of the other and propel the solids back into the flow or into the upstream side of the cutters. They ultimately encounter the grinder cutters and are reduced to a size that can freely pass through the screen openings such as slots, mesh or other configuration. It should be recognized that removed particles can be re-circulated more than once before they pass through the grinder for size reduction. In addition, it should be noted that the counter-rotating intermeshing teeth of the twin shaft grinder do not protrude into the openings of the screen's surface. But they are disposed and held rigidly fixed and close enough thereto so that the grinder teeth are able to push or drag the solids from the surface of the screen as they move in either direction. Thus, there is no physical wear and tear to the surface of the screen as it is known to occur in the screen cleaning devices and systems of the prior art.

Further, it is another object of the invention to provide an effective and efficient self cleaning screen and grinder system that can handle very high flows of sewage with low power requirements with minimal system parts for greater reliability and with a higher level of solids processing.

BRIEF DESCRIPTION OF THE DRAWINGS

The above and other objects and features of the invention will become apparent from the following description of preferred embodiments, given in conjunction with the accompanying drawings, in which.

DETAILED DESCRIPTION OF THE PREFERRED EMBODIMENTS

Figure 1:
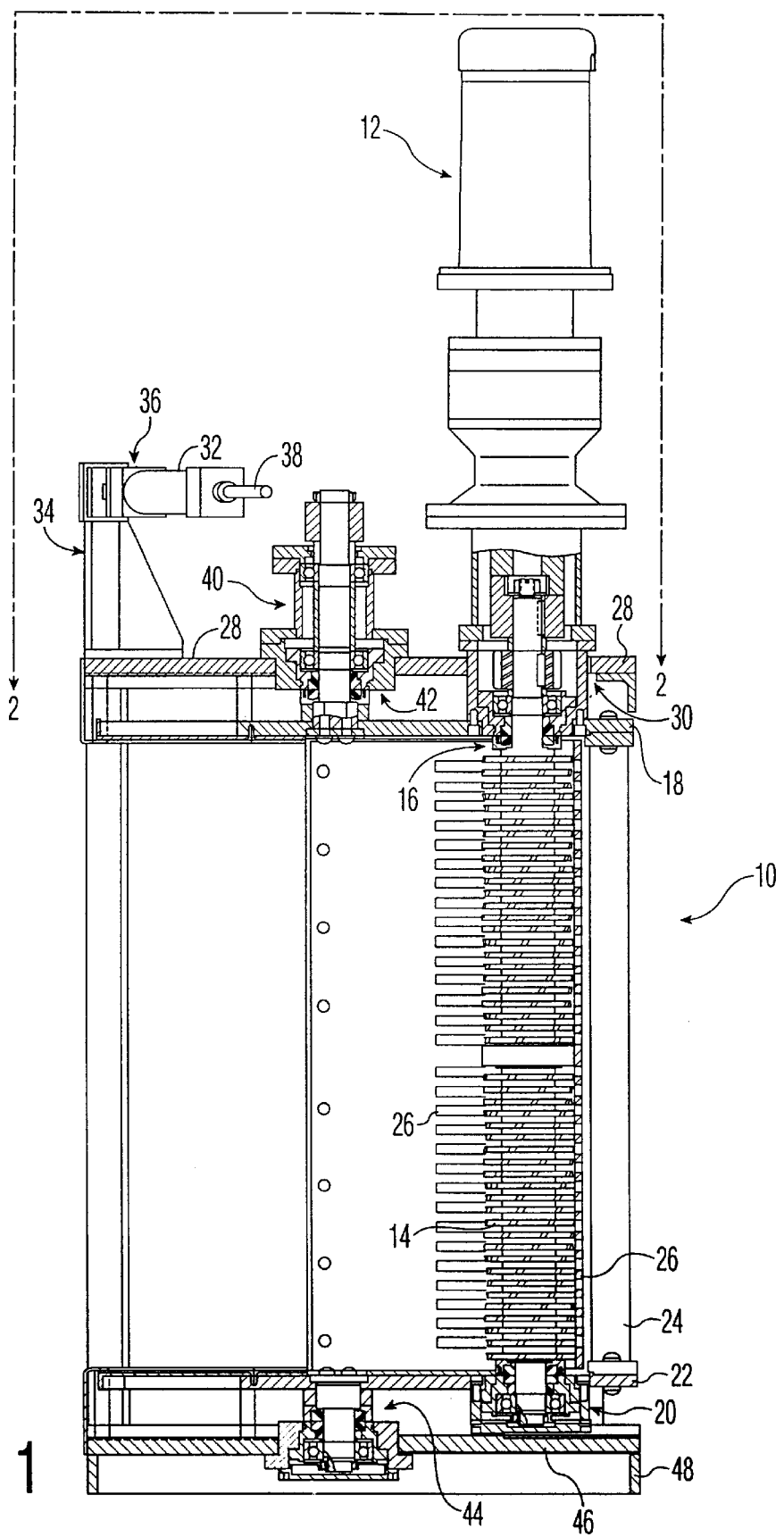
FIG. 1 shows a side view of an exemplary system of the present invention, depicting a direct drive for a twin shaft grinder mounted on a support frame supported by upper and lower bearing devices, wherein the support frame is actuated by a separate hydraulic cylinder for imparting reciprocal motion to the support frame of the grinder unit.

Referring now to FIG. 1, there is shown a side view of an exemplary screen cleaning and comminution system 10 in accordance with the present invention. This includes an electrical or hydraulic drive motor 12 operately connected to the twin shafts of a twin shaft grinder 14. It is supported by an upper bearing device 16 and a lower bearing device 20 connected to an upper horizontal support plate 18 and a lower horizontal support plate 22 respectively. Horizontal support plates 18 and 22 are connected to a pair of parallel disposed vertical support members 24. These form a U-shaped frame-like structure that adds stiffness and rigidity to the arrangement of three components, so that twin shaft grinder 14 is held fixedly and rigidly in place with respect to the filtering screen. As shown in FIG. 1, a filtering screen member 26 is disposed between vertical support members 24 and twin shaft grinder 14, extending vertically between upper and lower horizontal support members 18 and 22. The filtering screen 14 may have openings therein of different configuration, such as slots formed by spaced parallel elements, a mesh or other configuration. Since the grinder unit does not contact or penetrate the openings in the screen, the screen may have openings therein of a wide variety of configurations without departing from the scope of the present invention.

Continuing with the description of FIG. 1, the system 10 has an upper horizontal cover plate 28 having an arcuate-like opening 30 therein (not shown in this FIG. 1), through which drive motor 12 extends and where it is connected to the top of twin shaft grinder 14. A hydraulic cylinder device 32 is connected to a frame member 34 of the system at its rear end in a swivel-linking arrangement 36. The front end of the hydraulic cylinder 32 has a piston 38 extending therefrom that is connected and linked to a reciprocating device 40 that is connected to and supported by an upper horizontal cover plate 28. The reciprocating device 40 is connected to the U-shaped frame-like structure noted above, including upper support plate 18, lower support plate 22 and parallel vertical support members 24, at the top of an upper bearing device 42 and a lower bearing device 44.

By connecting reciprocating device 40 to the U-shaped frame-like structure, it is possible to move the drive motor 12, twin shaft grinder 14 and the parallel pair of support members 24 along an arcuate path in reciprocating motion through arcuate-like opening 30. Twin shaft grinder 14 is held in fixed and rigid spaced relationship to a screen 26 as the combination of the elements moves back and forth along the concave surface of the screen 26 so as to sweep and remove any solids contained on the screen. The lower bearing device 44 is connected to the lower support plate 22 and is further connected to and supported by a lower frame member 46. The lower frame member 46 is connected to a bottom base support member 48 upon which system 10 resides.

Figure 2:
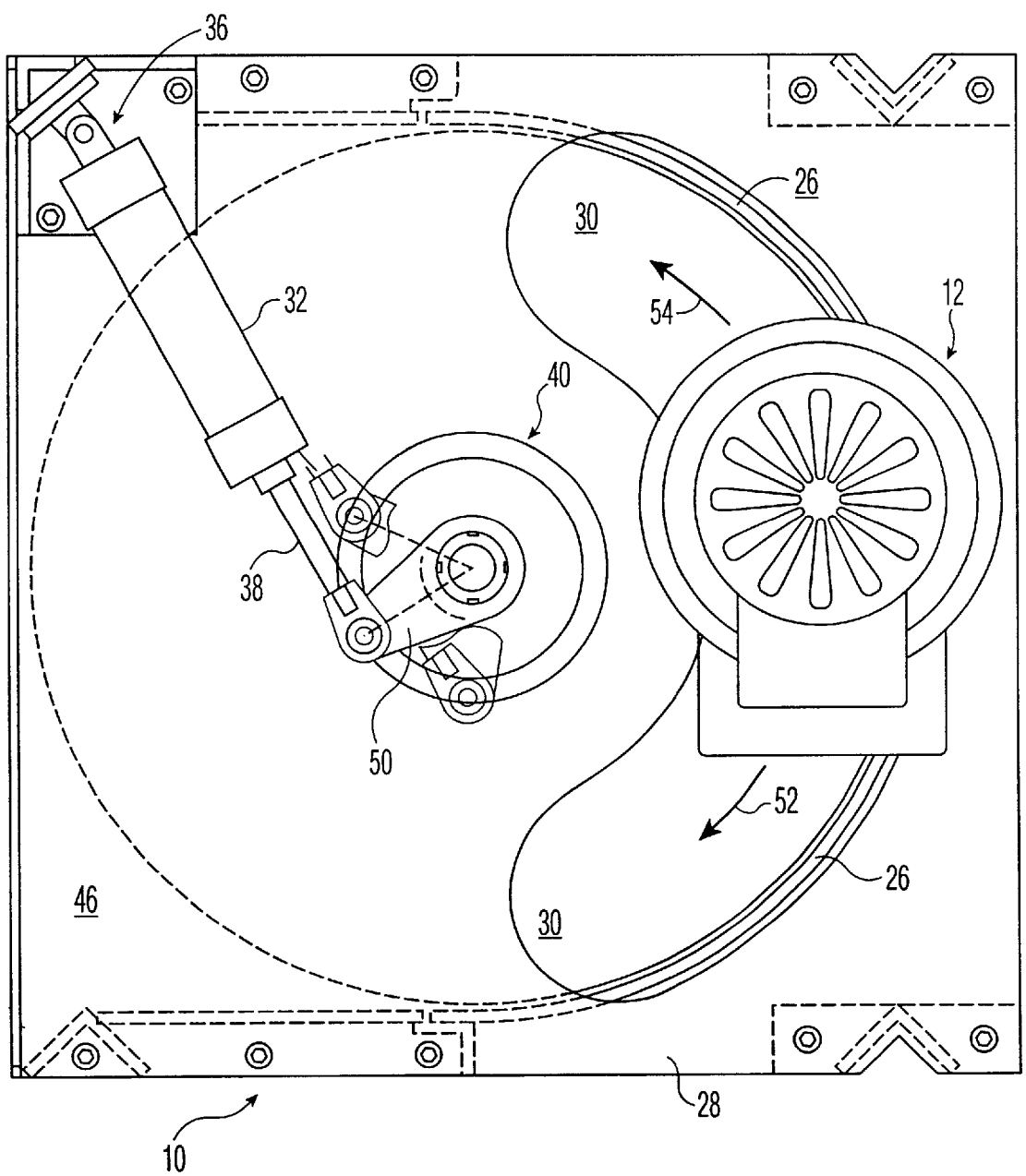
FIG. 2 shows a top view of the system of FIG. 1 taken along lines 2—2.

Referring now to FIG. 2, there is shown a top view of the system shown in FIG. 1, taken along lines 2—2, wherein the same reference numbers used in FIG. 1 are used in FIG. 2. As shown, the reciprocating device 40 has a crank arm 50 connected thereto at one end. It is connected at the other end in linking or swivel manner so that twin shaft grinder 14 is moved back and forth through opening 30 along a path indicated by the curved arrows 52 and 54, in close proximity to the surface of concave filtering screen 26. The grinder 14 is not shown in FIG. 2 since it is hidden from view by drive motor 12. Hydraulic cylinder 32 is actuated by a typical hydraulic system arrangement known in the prior art and in the interest of brevity is not shown here. If drive motor 12 is a hydraulic motor, it will also be actuated by a similar prior art hydraulic system and is also not shown.

Figure 3:
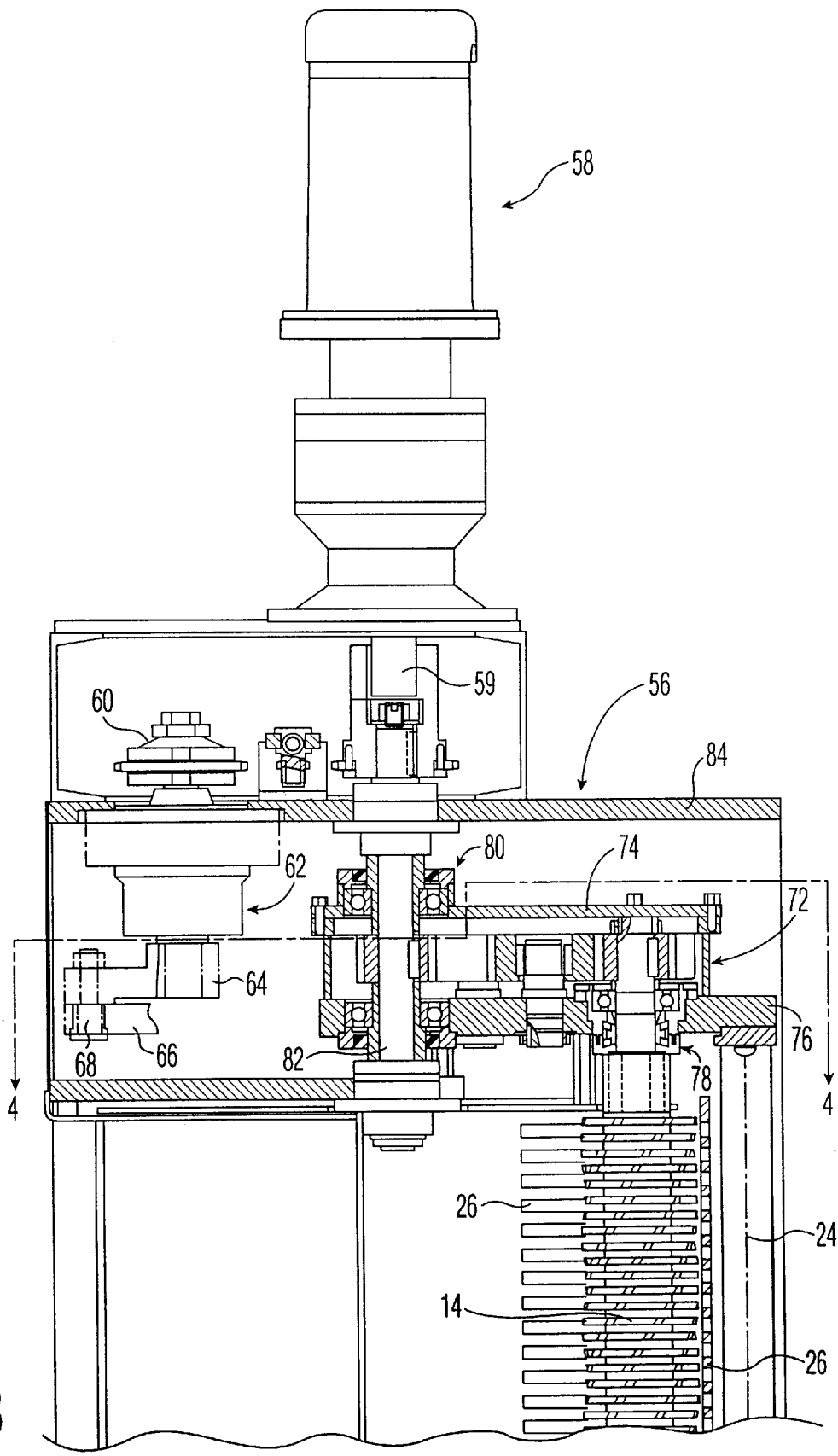
FIG. 3 shows a side view of the upper portion of a second exemplary apparatus or embodiment of the present invention, depicting a single means for driving the twin shafts of a grinder mounted on a support frame supported by upper and lower bearing devices, wherein the support frame is actuated by the same single drive means for imparting reciprocal motion to the support frame of the grinder.

Continuing with the detailed description of the present invention, reference is now made to FIG. 3. There is shown in FIG. 3, a second exemplary system 56 or embodiment of the invention that is similar to the system shown in FIG. 1. The primary difference between the two systems is that the embodiment, shown in FIG. 3, has a single drive means 58 for driving the twin shaft grinder 14 and for moving it in reciprocal motion, i.e., in back and forth motion in close proximity to the filtering screen 26. FIG. 3 illustrates a side view of the apparatus 56 of the invention, where the lower portion has been omitted in the interest of brevity since it is constructed in essentially the same as the lower portion of the apparatus shown in FIG. 1.

As can be seen in FIG. 3, a shaft 59 of drive means 58 can be linked to a coupling device 60 by means of chain, belt or gear arrangements. Coupling device 60 is connected to a speed reducing device 62, which is in turn connected to a crank-like linking device 64. Crank-like linking device 64 is connected to a first end of a reciprocal motion control arm 66 via a linking swivel connection 68. The other end of control arm 66 is connected to means 72 for driving twin shaft grinder 14 and providing a bearing 78 for supporting the upper end of the twin shaft grinder 14. A support member 74 covers means 72 and also is a support for a bearing device 80 for coupling shaft 82 of drive 58.

Figure 4:
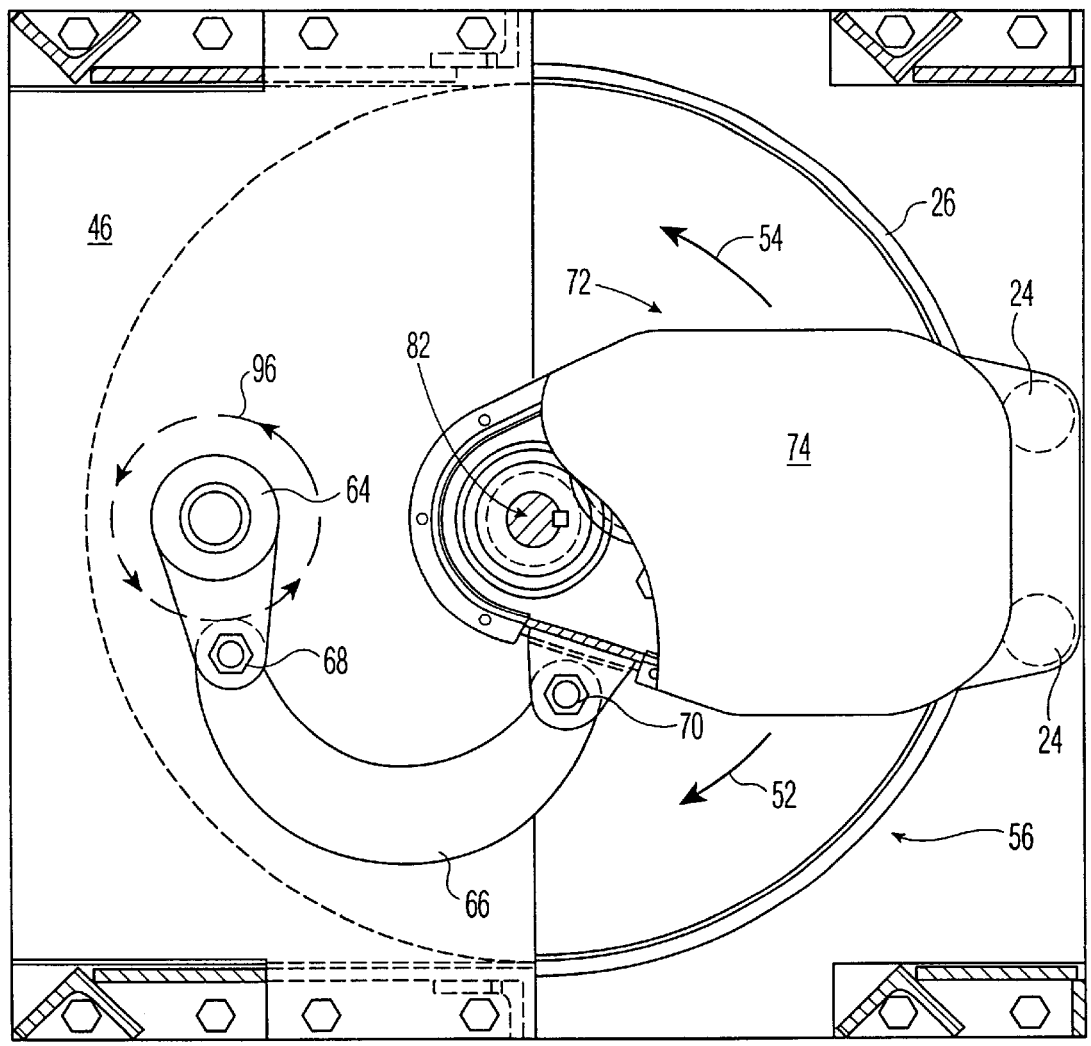
FIG. 4 shows a top view of the system of FIG. 3, when viewed as taken along lines 4—4.

Referring now to FIG. 4, there is shown a top view of the apparatus depicted in FIG. 3 taken along lines 4—4 thereof, where some of the various components discussed in connection with FIG. 3 are shown. FIG. 4 shows a view of screen cleaning apparatus 56 partly in cross-section, illustrating that means 72 for driving twin shaft grinder 14 back and forth along the concave surface of screen 26 is accomplished by crank-like linking device 64 and reciprocal motion control arm 66. As shown, crank-like linking device 64 is connected to the first end of the reciprocal motion control arm 66 at a swivel connection 68 and a second end of control arm is connected to a second swivel joint connection 70 that is part of means 72. Means 72 is partially covered by a cover plate 74, such that only a coupling shaft 82 of single drive means 58 is seen. Coupling shaft 82 is the axis about which means 72 pivots as it moves the grinder back and forth in reciprocating motion adjacent to the concave surface of screen 26. The parallel support members 24 can also be seen as part of the U-shaped frame structure, which supports the grinder in fixed rigid relationship to screen 26. It should be noted that support members 24 are considered important to the integrity of the apparatus where the members are connected to upper and lower support plates 18 and 22, respectively, to thereby form a component of the U-shaped frame structure noted above. A broken-line circle with the arrow heads designated by the reference number 96 illustrates the direction of rotation of crank-like linking device 64 which moves means 72 back and forth along paths indicated by curved arrows 52 and 54.

Figure 5:
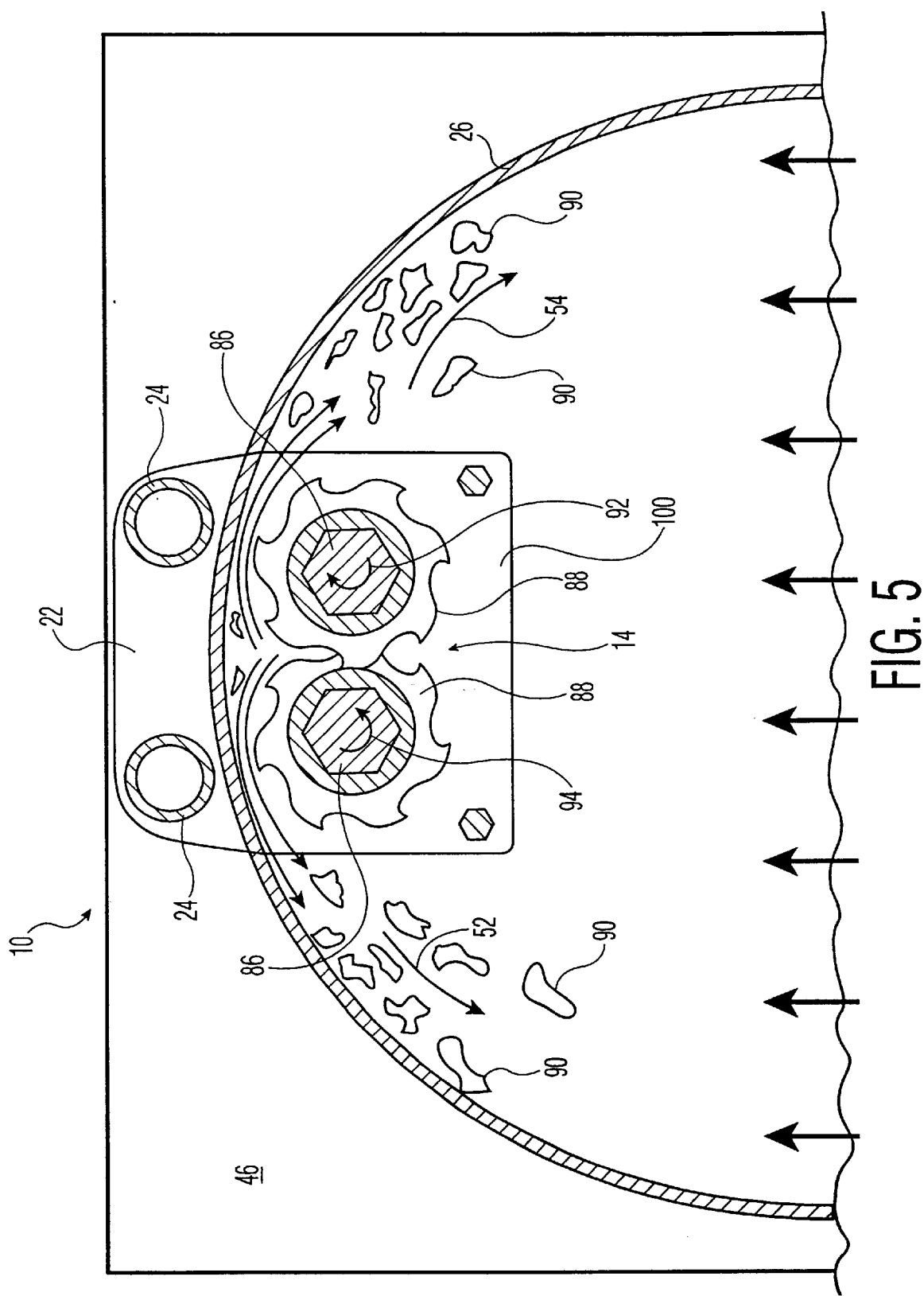
FIG. 5 is a partial schematic view of a twin shaft grinder and a filtering screen, depicting a close space relationship between teeth of the grinder and the concave semi-circular filtering screen surface and solid material in the fluid flow.

FIG. 5 is a fragmented cross-sectional view of the screen cleaning and comminuting system of the present invention which clearly depicts the twin shaft grinder 14, including a pair of parallel rotatable shafts 86 and a pair of intermeshing grinder teeth 88 disposed on the twin shafts 86. As shown, each of the shafts 86 rotates in opposite sense to one another as indicated by the curved arrows 92 and 94. Also shown in FIG. 5 are a plurality of solid material particles designated by reference number 90. As can readily been seen, the drawing illustrates the solid particles 90 being pushed in opposite directions on either side of grinder 14. Thereby the concave surface of screen 26 is swept clean, as the grinder passes close enough to make contact with the solid particles 90, but not so close to the screen that the grinder teeth touch the surface of the screen. It is noted that removal of the solids from the surface of the screen is the result of the grinder teeth 88 intercepting the solids, so as to remove them from the screen as illustrated. The back and forth motion of the grinder generates significant fluid motion near the surface of the screen in either direction, and this fluid motion or flow is an additional aid in the removal of solids from the surface of the screen. It is further understood that the solid matter, which is removed from the screen surface, is returned to a position upstream of flow, and ultimately is comminuted by grinder 14.

The principle modes of operation of the screen cleaning and comminuting systems 10 and 56 in accordance with the present invention are essentially the same as have been described. The primary difference between these two embodiments of the invention is the mechanism. By the mechanism, the twin shafts of the grinder 14 are caused to rotate and the mechanism by which the grinder unit 14 is moved in reciprocating motion in close proximity to the concave surface of screen 26 as it cleans solids therefrom. In accordance with the teachings of the present invention, the apparatus shown in FIG. 1 is driven by two drive motors. The apparatus shown in FIG. 3 is driven by a single drive means operatively connected to associated coupling means to provide both rotational motion for the twin shaft grinder and reciprocating motion to move the grinder unit 14 along the concave surface of the filtering screen 26.

The operation of said twin shaft grinder 14 as a comminuting device is described briefly. As shown in FIG. 5, the grinder unit 14 includes two drive shafts 86 whose lengths extend to essentially the full depth of the liquid substance flow in channel and they rotate in opposite sense to one another. Each shaft has a shredding member disposed thereon containing shredding teeth 88 which extend to the full length thereof for shredding and grinding solid matter contained in the liquid flow of the channel such as a sewage channel. It should be noted that the twin shaft grinder unit of the present invention has two novel functions, that is to operate as a grinder for sizing solids while simultaneously operating as a sweeper to remove solid material from the surface of filtering screen 26 without making physical contact therewith.

In accordance with the preferred embodiment of the invention, rotatable turn-table with central support is provided for ease of sealing and securing through conventional means. Arc screen and U-shaped frame of the invention have smooth shape to prevent from hangup and promote complete processing and smooth flow. Further, support means behind screen of the invention is provided for support of grinder structures, and unique design of the invention eliminates gaps formed in prior art which can cause incomplete processing by allowing solid to pass therethrough.

In accordance with the present invention, the simple and unique construction provides a system, which allows the liquid sewage being processed to flow therethrough with minimum hindrance. In addition, the filtering screen, screen sweeping device and grinder may operate in a variety of configuration and are more compatible for maximum through-put performance than prior art devices and systems. The directional clearing properties of the reciprocating grinding member insure that solids which impact the screen can be aggressively removed from the screen surface and redirected by the grinder back into flow path of the sewage system during each cycle. Therefore, it is possible to keep the filtering screen clear of solids and enhance the performance and efficiency of the system. While the use of a single means to drive the various moving parts of any apparatus may be advantageous, the use of the novel screening and sweeping action in accordance with the present invention is most important when assessing whether one or more drives are utilized.

It should be understood that the above-described embodiments are only illustrative of the principles applicable to the invention. Various other arrangements and modifications may be made without departing from the spirit and scope of the invention as set forth in the following claims.

What is claimed is:

1. An apparatus for screening and recirculating solid material contained in a fluid flow, said apparatus comprising:
    (a) a stationary sizing screen member having a semi-cylindrical-like screening surface with a plurality of openings for sizing material particles and being disposable in the path of the fluid flow containing material particles and extending to the full width and depth thereof, wherein larger solid material particles intercepted are cleared and removed from the screening surface and are recirculated into the path of the flow for subsequent sizing;
    (b) a combined unit of a comminuting grinder having twin rotary shafts and a sweeper, the unit being associated with and disposed directly in front of the screen in fixed space relationship for removing and sweeping the intercepted solid material particles from the screening surface, wherein the combined unit completes a multiple sweeping cycle of motion parallel along the screening surface; and
    (c) drive means connected to the sweeper unit for providing rotary motion to the shafts of the comminuting grinder and arcuate sweeping action to the combined unit along the screening surface.

2. The apparatus in accordance with claim 1, wherein said plurality of openings are a plurality of parallel slots.

3. The apparatus in accordance with claim 2, wherein the screening surface with a plurality of parallel slots is disposed in either horizontal or vertical direction.

4. The apparatus in accordance with claim 1, wherein said twin rotary shafts rotate in opposing sense to one another.

5. The apparatus in accordance with claim 1, wherein said screening surface has a mesh configuration.

6. The apparatus in accordance with claim 1, wherein said drive means comprises a direct drive motor for driving said comminuting grinder and a separate hydraulic cylinder unit which is connected to a crank-like device connected to a frame, said grinder being fixedly supported for reciprocating action along the concave contour of the screen.

7. The apparatus in accordance with claim 6, wherein said direct drive motor is either a hydraulic or an electrical motor.

8. The apparatus in accordance with claim 1, wherein said drive means comprises a single electric drive motor that is first mechanically linked to said comminuting grinder for driving said grinder and a second mechanically linked device connected to a frame, said grinder being fixedly supported for reciprocating motion along the concave contour of the screen.

9. A comminuting apparatus being movably disposed in a liquid channel for screening large solid matter suspended in the channel, said apparatus comprising:
    (a) a sizing screen extending to substantially the full width and depth of the channel disposed in fixed parallel spaced position to a combined unit of a twin shaft shredder and a sweeper, the sizing screen having a semi-cylindrical-like screening surface with a plurality of horizontal parallel slots and disposed in the path of the liquid and extending to the full width and depth thereof for intercepting large size of solid matter suspended therein on the semi-cylindrical like surface, wherein intercepted solid matter is cleared and removed from said surface by the combined unit and said removed solid matter is recirculated into the path of said liquid;
    (b) a combined unit of a twin shaft shedder and a sweeper, twin shaft shredder including two drive shafts whose lengths extend to the full depth of the liquid rotating in opposite sense to one another, each shaft having a shredding member disposed thereon extending to the full length thereof for shredding and grinding said solid matter as the liquid flows into the twin shaft shredder and the twin shaft shredder being disposed and connected in parallel position to said sizing screen; and
    (c) drive means operately connected to the combined unit of the twin shaft shredder and the sweeper for providing rotary motion to the shafts of the twin shaft shredder and sweeping action to the combined unit along the screening surface.

10. The apparatus in accordance with claim 9, wherein said screening surface with a plurality of parallel slots is disposed in either horizontal or vertical directions.

11. A method of screen cleaning and comminuting sewage solids, said method comprising the steps of:
    (a) intercepting large solids carried by sewage stream on a sizing and filtering screen;
    (b) removing said solids from said screen by means of a combined comminuting and sweeping unit;
    (c) comminuting the solids by said combined unit; and
    (d) propelling the comminuted solids through said screen along with the oncoming stream.

12. The method in accordance with claim 11, wherein said intercepting step is done by a screen having a concave semi-cylindrical-like intercepting screening surface.

13. An apparatus for treating sewage, comprising:
    (a) a filtering and sizing screen placed across a channel of sewage;
    (b) a combined unit of a solid remover and a comminuting grinder disposed adjacent to an upstream surface of the screen, said unit being adapted for removing solid matter from the screen and recirculating same into sewage flow upstream for subsequent comminution and said unit comprising twin rotary shaft grinder members having the twin rotary shafts disposed in a plane parallel to the plane of said screen and all cutters acting to clean said screen;
    (c) means connected for reciprocating said unit along said screen to periodically sweep whole upstream surface of the screen; and
    (d) drive means for providing rotary motion to the shafts of said twin shaft grinder and reciprocating motion to said combined unit parallel along said surface of said screen.

14. The apparatus in accordance with claim 13, wherein said screen has a concave semi-cylindrical-like screening surface.

15. The apparatus in accordance with claim 13, wherein said twin rotary shafts rotate in oppose sense to one another.

* * * * *